United States Patent [19]

Ballheimer et al.

[11] Patent Number: 5,325,834
[45] Date of Patent: Jul. 5, 1994

[54] METHOD OF AND CONVERSION KIT FOR CONVERTING AN ENGINE TO HYDRAULICALLY-ACTUATED FUEL INJECTION SYSTEM

[75] Inventors: Benny Ballheimer; Lloyd E. Thompson, both of Peoria, Ill.

[73] Assignee: Caterpillar Inc., Peoria, Ill.

[21] Appl. No.: 100,953

[22] Filed: Aug. 3, 1993

[51] Int. Cl.$^5$ .................... F02M 47/02; F02M 55/02
[52] U.S. Cl. ............................. 123/446; 123/456; 123/470
[58] Field of Search .............. 123/446, 447, 456, 509, 123/470

[56] References Cited

U.S. PATENT DOCUMENTS

| | | | |
|---|---|---|---|
| 3,125,078 | 3/1964 | Reiners | 123/470 |
| 4,448,166 | 5/1984 | Amemori et al. | 123/446 |
| 4,599,983 | 7/1986 | Omachi | 123/497 |
| 4,628,881 | 12/1986 | Beck et al. | 123/446 |
| 4,813,601 | 3/1989 | Schwerdt et al. | 123/446 |
| 5,007,401 | 4/1991 | Grohn et al. | 123/509 |
| 5,033,435 | 7/1991 | Ostarello et al. | 123/469 |
| 5,062,405 | 11/1991 | Daly | 123/456 |
| 5,119,881 | 6/1992 | Cagle | 164/137 |
| 5,191,867 | 3/1993 | Glassey | 123/446 |
| 5,197,532 | 3/1993 | Cagle | 164/137 |

OTHER PUBLICATIONS

U.S. Application No. 07/776,516 filed Oct. 11, 1991, entitled "Hydraulically-Actuated Fuel Injector System Having Separate Internal Actuating Fluid and Fuel Passages".

*Primary Examiner*—E. Rollins Cross
*Assistant Examiner*—Thomas N. Moulis
*Attorney, Agent, or Firm*—Diana L. Charlton

[57] ABSTRACT

The design and manufacture of past fuel injection systems required extensive modification of the cylinder head in order to provide and actuate hydraulically actuated fuel injectors. Additionally, methods to avoid the cylinder head modifications have presented reliability concerns. The present invention overcomes these problems by providing an adapter assembly releasably connected to the cylinder head. The adapter assembly includes an adapter which has an integrally formed actuating fluid manifold and an integrally formed fuel manifold. The present invention provides a means for communicating between the actuating fluid manifold and the actuating fluid inlet passage of a hydraulically actuated fuel injector and a means for communicating between the fuel manifold and the fuel inlet passage of the fuel injector. Actuating fluid is communicated through the actuating fluid manifold and into the actuating fluid inlet passage in order to actuate the fuel injector. This results in a more reliable system which eliminates costly modifications to the cylinder head.

13 Claims, 2 Drawing Sheets

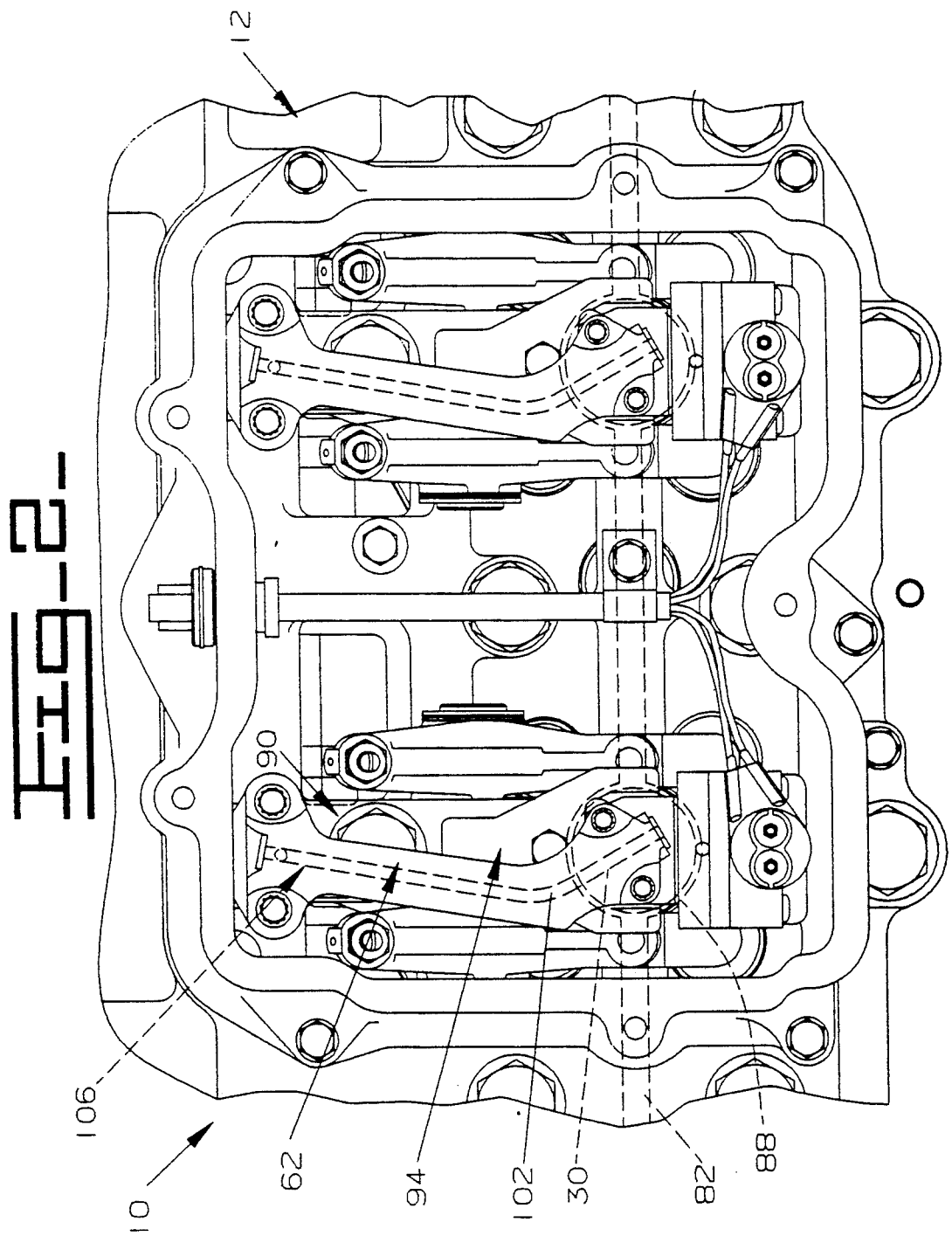

METHOD OF AND CONVERSION KIT FOR CONVERTING AN ENGINE TO HYDRAULICALLY-ACTUATED FUEL INJECTION SYSTEM

DESCRIPTION

1. Technical Field

This invention relates generally to a hydraulically-actuated fuel injection system for an internal combustion engine and more particularly to the ability to convert an engine to a hydraulically-actuated fuel injection system without major engine modification.

2. Background Art

Hydraulically-actuated fuel injection systems have been used in order to enhance control of the pressures needed for fuel injection while increasing the reliability and simplicity of the engine design.

Some prior art fuel systems utilize a hydraulically-actuated fuel injection system by providing separate actuating fluid and fuel manifolds or passages which are internally disposed within the cylinder head in order to simplify assembly and disassembly of the engine. However, in order to manufacture the passages internally within the cylinder head, the existing cylinder head must be modified at significant manufacturing costs.

Other prior art fuel systems, such as the one disclosed in U.S. Pat. No. 5,033,435 issued to Joseph V. Ostarello et. al. on Jul. 23, 1991, include a conduit system which is shown connected between the fuel injector and the fuel manifold. The conduit system is an external fuel line which is complicated, costly, and difficult to maintain and service. Furthermore, the addition of the fuel manifold outside the cylinder head offers no structural advantages to the engine.

The present invention discloses a method of and conversion kit for converting an engine to a hydraulically-actuated fuel injection system without major engine modifications. The present invention may be retrofitted to an existing engine in order to upgrade the engine without expensive modifications. Additionally, the present invention may be included during the manufacture of an engine to provide a hydraulically-actuated fuel injection system. The present invention also increases structural integrity of the engine by increasing the overall stiffness of the engine components.

DISCLOSURE OF THE INVENTION

In one aspect of the present invention a fuel injection system for an internal combustion engine has a cylinder block and a conventionally mounted cylinder head which defines a plurality of injector bores. The system includes an adapter assembly releasably connected to the cylinder head to define an actuating fluid manifold and a plurality of injector bores in substantial axial alignment with the plurality of injector bores in the cylinder head, a plurality of injector sleeves which are positioned in each of the plurality of injector bores in the cylinder head and the adapter assembly, and a plurality of hydraulically actuated fuel injectors. One of the plurality of injectors is positioned in each of the plurality of injector sleeves. The injectors each have an actuating fluid inlet passage. The adapter assembly includes an actuating fluid passage means for communicating between the actuating fluid manifold and the actuating fluid inlet passage of each of the injectors.

In another aspect of the present invention a fuel injection system for an internal combustion engine has a cylinder block and a conventionally mounted cylinder head which defines a plurality of injector bores. The system includes an adapter assembly releasably connected to the cylinder head to define an actuating fluid manifold, a fuel manifold, and a plurality of injector bores in substantial axial alignment with the plurality of injector bores in the cylinder head. A plurality of injector sleeves are positioned in each of the plurality of injector bores in the cylinder head and the adapter assembly. The system includes a plurality of hydraulically actuated fuel injectors with one of the plurality of injectors positioned in each of the plurality of injector sleeves. The injectors each have an actuating fluid inlet passage. The adapter assembly includes an actuating fluid passage means for communicating between the actuating fluid manifold and the actuating fluid inlet passage of each of the injectors. The adapter assembly further includes a fuel passage means for communicating between the fuel manifold and the fuel inlet passage of each of the injectors.

In yet another aspect of the present invention a method of converting an internal combustion engine to a hydraulically actuated fuel injection system includes the engine having a cylinder block and a conventionally mounted cylinder head which defines a plurality of injector bores. The method includes releasably connecting an adapter assembly to the cylinder head so that the adapter defines an actuating fluid manifold, a fuel manifold, and a plurality of injector bores in substantial axial alignment with the plurality of injector bores in the cylinder head. The method further includes positioning a fuel injector sleeve in each of the plurality of injector bores in the cylinder head and the adapter assembly and positioning a hydraulically actuated fuel injector having an actuating fluid inlet passage and a fuel inlet passage in each of the injector sleeves. The method also includes providing communication between the actuating fluid manifold and the actuating fluid inlet passage of each of the injectors to actuate the fuel injection system and providing communication between the fuel manifold and the fuel inlet passage of each of the injectors.

The disadvantage of the prior art is that they fail to provide an economical, simple, and reliable means to convert an engine to a hydraulically-actuated fuel injection system. The present invention, through the use of an adapter assembly releasably connected to the cylinder head, virtually eliminates cylinder head modifications and associated costs and provides a reliable engine component for actuating the fuel system while increasing the structural integrity of the engine.

BRIEF DESCRIPTION OF THE DRAWINGS

FIG. 2 is a diagrammatic partial top view of the embodiment of FIG. 1.

BEST MODE FOR CARRYING OUT THE INVENTION

Figure 1:
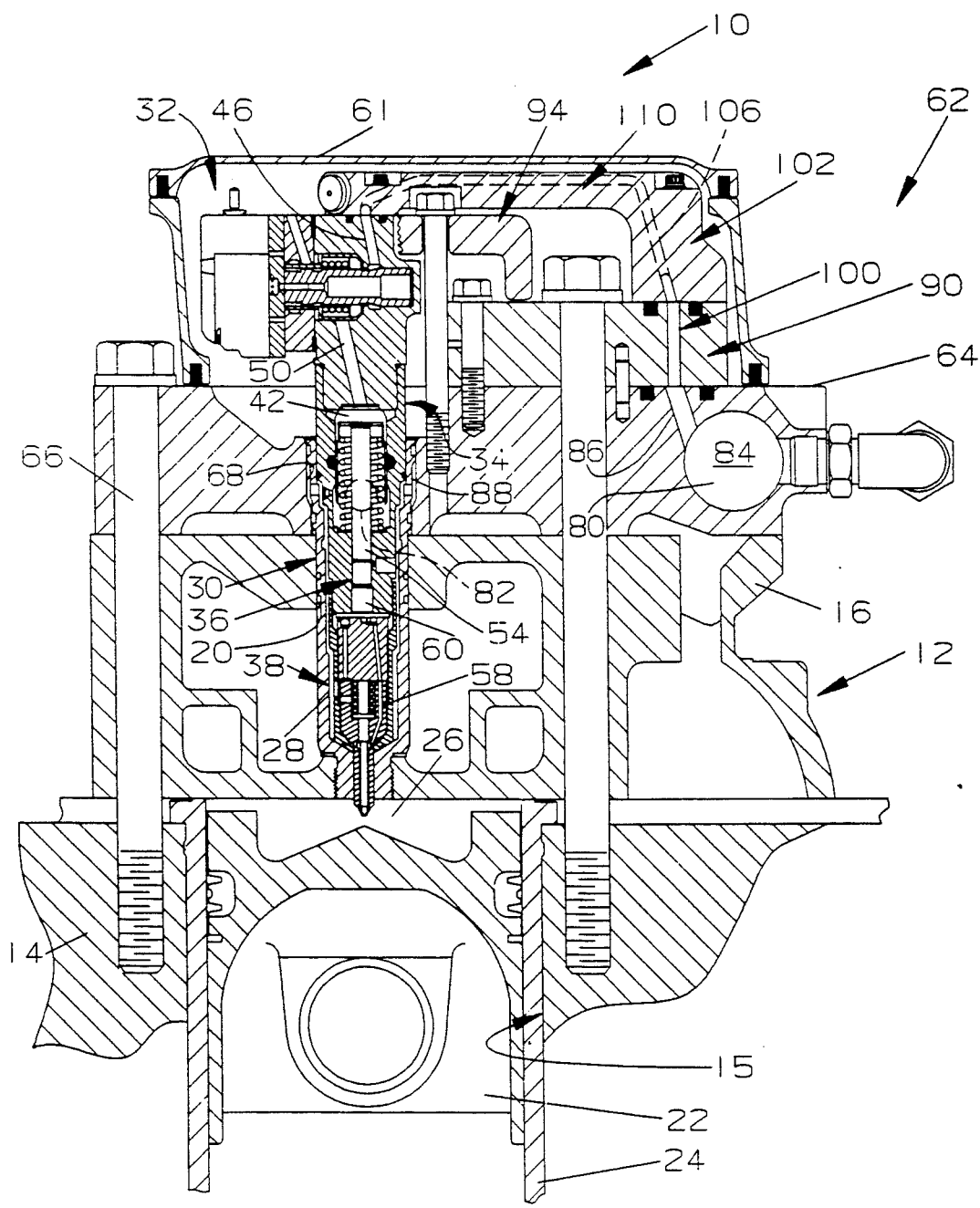
FIG. 1 is a diagrammatic partial cross-sectional view of an internal combustion engine including an embodiment of the present invention.

A hydraulically actuated electronically controlled unit injector fuel system 10, hereinafter referred to as a fuel injection system, for an internal combustion engine 12 having a cylinder block 14 is shown in FIGS. 1 and 2. The cylinder block 14 has a plurality of cylinder bores formed therein, one of which is shown at 15. A cylinder head 16 is conventionally mounted to the cylinder block 14 and defines a plurality of injector bores, one of which is shown at 20. A piston 22 and cylinder liner 24 are conventionally mounted within each of the cylinder bores 15 in closing relation to the cylinder head 16 to define a combustion chamber 26.

The fuel injection system 10 has a plurality of fuel injector sleeves, one of which is shown at 28, positioned in each of the respective plurality of injector bores 20 and a plurality of hydraulically actuated fuel injectors, one of which is shown at 30, disposed within the injector sleeves 28. Each of the fuel injectors 30 have an actuator and valve assembly 32, a body assembly 34, a barrel assembly 36, and a nozzle and tip assembly 38. The body assembly 34 includes an intensifier piston 42, a first actuating fluid inlet passage 46, and a second actuating fluid inlet passage 50 communicating the actuator and valve assembly 32 with the intensifier piston 42. The barrel assembly 36 includes a plunger 54 operatively associated with the intensifier piston 42. The nozzle and tip assembly 38 includes a fuel inlet passage 58 which is separate and independent of the actuating fluid inlet passages 46,50 and a fuel chamber 60 operatively associated with the plunger 54 and communicating with the fuel inlet passage 58. A cylinder head cover 61 is connected to cover the cylinder head 16 and to enclose the fuel injectors 30.

An adapter assembly 62 is releasably connected to the engine 12 to actuate the fuel injection system 10. The adapter assembly 62 includes an adapter 64 which extends across and is releasably mounted to the cylinder head 16 by a plurality of bolts, one of which is shown at 66. The adapter 64 defines a plurality of injector bores, one of which is shown at 68, in substantial axial alignment with the injector bores 20. The adapter 64 has an integrally formed actuating fluid manifold 80 and an integrally formed fuel manifold 82 which are internal passages within the adapter 64. The actuating fluid manifold 80 has a common rail passage 84 which extends across the cylinder head 16 in spaced relation to the fuel injectors 30. A plurality of spaced rail branch passages 86 corresponding to the number of fuel injectors 30 extend from the common rail passage and through the adapter 64. The fuel manifold 82 extends across the cylinder head 16 and has a common fuel branch 88 circumferentially surrounding the fuel injectors 30.

The adapter assembly 62 includes a plurality of rocker shaft supports, one of which is shown at 90, which are releasably connected to the adapter 64 in a conventional manner to hold the rocker shaft (not shown) in position. A plurality of L-shaped injector clamps, one of which is shown at 94, are releasably connected to the adapter 64 in order to hold the fuel injectors 30 in position within the injector sleeves 28 in a conventional manner. The rocker shaft supports 90 each define a transition passage 100 therethrough. The rocker shaft supports 90 are operatively associated with the adapter 64 and are positioned so that the transition passages 100 are in substantial alignment with a corresponding rail branch passage 86 within the adapter 64.

The adapter assembly 62 includes a plurality of housings 102, which are releasably connected to and are operatively associated with the adapter 64. The housings 102 each define a fluid connecting passage 106 therein. The housings 102 are positioned so that the fluid connecting passages 106 are in substantial alignment with the corresponding transition passages 100 at one end and the corresponding first actuating fluid inlet passages 46 at an opposite end.

The adapter assembly 62 includes a fuel passage means, such as the fuel branch 88, for communicating the fuel manifold 82 with the fuel inlet passage 58 of each of the fuel injectors 30. The adapter assembly 62 includes a actuating fluid passage means 110 for communicating the actuating fluid manifold 80 with the first actuating fluid inlet passage 46 of each of the fuel injectors 30. The actuating fluid passage means 110 is located internally within the adapter assembly 62 and is defined by the common rail passage 84, rail branch passages 86, transition passages 100, and the fluid connecting passages 106. It should be noted that the actuating fluid passage means 110 could be an individual external fluid actuating line or any other suitable means operatively associated with the adapter 64 for communicating the actuating fluid manifold 80 with the first actuating fluid inlet passage of each of the fuel injectors.

It should be noted that, preferably, the fluid used for the actuating fluid is a liquid which has a relatively higher viscosity than fuel under the same conditions. For example, the actuating fluid may be engine lubrication oil. The engine lubrication oil communicates with the actuating fluid manifold 80 by any suitable means, such as a series of passages or lines connected to an oil pump (not shown) of a conventional design. The fuel communicates with the fuel manifold 82 by any suitable means, such as a series of passages or lines connected to a fuel transfer pump (not shown).

INDUSTRIAL APPLICABILITY

In order to convert an engine to a hydraulically actuated fuel injection system 10, the adapter 64 is releasably connected to the cylinder head 16 and the rocker shaft supports 90 are releasably connected to the adapter 64. The injector sleeves 28 are positioned within the injector bores 20,68 of the cylinder head 16 and adapter 64 and releasably connected to the cylinder head 16. The fuel injectors 30 are positioned within the injector sleeves 28. The injector clamps 94 are positioned on the rocker shaft supports 90 at one end and are fitted against the body assembly 34 of the fuel injectors 30 in order to hold the fuel injectors 30 in the injector bores 20,68. The housings 102 are releasably connected to the rocker shaft supports 90.

An electronic control signal is sent by a conventional electronic control module (not shown) to actuate the actuator and valve assembly 32 of a selected fuel injector 30. The actuator and valve assembly 32 allows pressurized hydraulic actuating fluid to communicate from the actuating fluid manifold 80 to the intensifier piston 42 of each of the fuel injectors 30 via the common rail passage 84, rail branch passage 86, transition passage 100, fluid connecting passage 106, and first and second actuating inlet passage 46,50. Simultaneously, fuel enters the fuel chamber 60 from the fuel manifold via the fuel branch 88. The pressurized hydraulic actuating fluid displaces the intensifier piston 42 which, in turn, pushes the plunger 54 downwardly to pressurize the fuel in the fuel chamber 60 to a selected injection pressure. When the fuel pressure within the fuel chamber exceeds the opening pressure of an injection valve within the nozzle and tip assembly 38, the fuel injector 30 injects fuel into the combustion chamber 26. Fuel injection is ended by terminating the control signal which causes the actuator and valve assembly 32 to depressurize the actuating fluid communicated to the intensifier piston 42 which, in turn, lowers the pressure of the fuel in the fuel chamber 60 below the closing pressure of the injection valve.

It should be understood that although the present invention may be used to convert an existing engine to a hydraulically actuated fuel injection system, the present invention may also be included during engine manufacturing to initially provide the engine with a hydraulically actuated fuel injection system.

In view of the above, it is apparent that the present invention eliminates modification of a cylinder head by providing an improved means for converting an engine to a hydraulically actuated fuel injection system. The present invention reduces costs and increases reliability by utilizing an adapter assembly releasably connected to the cylinder head. The adapter assembly includes an adapter which has an integrally formed actuating fluid manifold and an integrally formed fuel manifold. A means for communicating the actuating fluid manifold with a first actuating inlet passage of a hydraulically actuated fuel injector is provided to actuate the fuel injection system.

We claim:

1. 1. A fuel injection system for an existing internal combustion engine, the engine having a cylinder block and a cylinder head defining a plurality of injector bores and being conventionally mounted to the cylinder block, comprising:
   - an adapter assembly releasably connected to the cylinder head and defining an actuating fluid manifold therein and a plurality of injector bores in substantial axial alignment with the plurality of injector bores in the cylinder head;
   - a plurality of fuel injector sleeves, one positioned in each of the plurality of injector bores in the cylinder head and the adapter assembly;
   - a plurality of hydraulically-actuated fuel injectors, one positioned in each of the plurality of injector sleeves with the injectors each having an actuating fluid inlet passage; and
   - the adapter assembly including actuating fluid passage means for communicating between the actuating fluid manifold and the actuating fluid inlet passage of each of the injectors.

2. The fuel injection system of claim 1, wherein the adapter assembly includes an adapter releasably connected to the cylinder head and at least one housing releasably connected to the adapter.

3. The fuel injection system of claim 2, wherein the actuating fluid passage means includes at least one fluid connecting passage defined within the housing.

4. The fuel injection system of claim 3, wherein the actuating fluid manifold is an internal passage integrally formed with the adapter, the actuating fluid manifold being in communication with the fluid connecting passage.

5. A fuel injection system for an internal combustion engine, the engine having a cylinder block and a cylinder head defining a plurality of injector bores and being conventionally mounted to the cylinder block, comprising:
   - an adapter assembly releasably connected to the cylinder head and defining an actuating fluid manifold, a fuel manifold, and a plurality of injector bores in substantial axial alignment with the plurality of injector bores in the cylinder head;
   - a plurality of fuel injector sleeves, one positioned in each of the plurality of injector bores in the cylinder head and the adapter assembly;
   - a plurality of hydraulically-actuated fuel injectors, one positioned in each of the plurality of injector sleeves with the injectors each having an actuating fluid inlet passage and a fuel inlet passage;
   - the adapter assembly including actuating fluid passage means for communicating between the actuating fluid manifold and the actuating fluid inlet passage of each of the injectors; and
   - the adapter assembly including fuel passage means for communicating between the fuel manifold and the fuel inlet passage of each of the injectors.

6. The fuel injection system of claim 5, wherein the adapter assembly includes an adapter releasably connected to the cylinder head and at least one housing releasably connected to the adapter.

7. The fuel injection system of claim 6, wherein the actuating fluid passage means includes at least one fluid connecting passage defined within the housing.

8. The fuel injection system of claim 7, wherein the fuel passage means includes a fuel branch defined within the adapter.

9. The fuel injection system of claim 8, wherein the actuating fluid manifold is an internal passage integrally formed with the adapter, the actuating fluid manifold being in communication with the fluid connecting passage.

10. The fuel injection system of claim 9, wherein the fuel manifold is an internal passage integrally formed with the adapter, the fuel manifold being in communication with the fuel branch.

11. A method of converting an internal combustion engine to a hydraulically actuated fuel injection system, the engine having a cylinder block and a cylinder head defining a plurality of injector bores and being conventionally mounted to the cylinder block, comprising the steps of:
    - connecting an adapter assembly releasably to the cylinder head, the adapter assembly defining an actuating fluid manifold, a fuel manifold, and a plurality of injector bores in substantial axial alignment with the plurality of injector bores in the cylinder head;
    - positioning a fuel injector sleeve in each of the plurality of injector bores in the cylinder head and the adapter assembly;
    - positioning a hydraulically-actuated fuel injector in each of the plurality of injector sleeves, the injectors each having an actuating fluid inlet passage and a fuel inlet passage;
    - providing communication between the actuating fluid manifold and the actuating fluid inlet passage of each of the injectors; and
    - providing communication between the fuel manifold and the fuel inlet passage of each of the injectors.

12. The method of converting an internal combustion engine of claim 11, including the steps of:
    - providing an adapter and at least one housing as part of the adapter assembly;
    - forming at least one fluid connecting passage within the housing; and
    - forming a fuel branch within the adapter.

13. The method of converting an internal combustion engine of claim 12, including the steps of:
    - forming the actuating fluid manifold integrally with the adapter;
    - forming the fuel manifold integrally with the adapter;
    - communicating the actuating fluid manifold with the fluid connecting passage; and
    - communicating the fuel manifold with the fuel branch.

* * * * *